United States Patent
Nakamoto et al.

(10) Patent No.: US 9,991,560 B2
(45) Date of Patent: Jun. 5, 2018

(54) LIQUID ELECTROLYTE FOR FLUORIDE ION BATTERY AND FLUORIDE ION BATTERY

(71) Applicants: TOYOTA JIDOSHA KABUSHIKI KAISHA, Toyota-shi, Aichi-ken (JP); KYOTO UNIVERSITY, Kyoto-shi, Kyoto-fu (JP)

(72) Inventors: Hirofumi Nakamoto, Kyoto (JP); Zempachi Ogumi, Kyoto (JP); Takeshi Abe, Takatsuki (JP)

(73) Assignees: TOYOTA JIDOSHA KABUSHIKI KAISHA, Toyota (JP); KYOTO UNIVERSITY, Kyoto (JP)

( * ) Notice: Subject to any disclaimer, the term of this patent is extended or adjusted under 35 U.S.C. 154(b) by 237 days.

(21) Appl. No.: 14/851,678

(22) Filed: Sep. 11, 2015

(65) Prior Publication Data
US 2016/0087308 A1    Mar. 24, 2016

(30) Foreign Application Priority Data
Sep. 19, 2014 (JP) ................................ 2014-191350

(51) Int. Cl.
  *H01M 10/0567* (2010.01)
  *H01M 10/054* (2010.01)
  (Continued)

(52) U.S. Cl.
  CPC ..... *H01M 10/0567* (2013.01); *H01M 10/054* (2013.01); *H01M 10/0568* (2013.01); *H01M 10/0569* (2013.01); *H01M 2300/0034* (2013.01)

(58) Field of Classification Search
  None
  See application file for complete search history.

(56) References Cited

U.S. PATENT DOCUMENTS 6,489,055 B1    12/2002  Ichihashi et al.
2012/0115002 A1*  5/2012  Fukunaga ........... H01M 10/399
                                          429/103
(Continued)

FOREIGN PATENT DOCUMENTS

EP    0938151   *  8/1999
EP    0938151 A2    8/1999
(Continued)

OTHER PUBLICATIONS

Henderson, W.A., "Chapter 1: Nonaqueous Electrolytes: Advances in Lithium Salts," Electrolytes for Lithium and Lithium-Ion Batteries, Jan. 1, 2014, pp. 1-92.

*Primary Examiner* — Sarah A. Slifka
(74) *Attorney, Agent, or Firm* — Oliff PlC (57) ABSTRACT

The present invention aims to a liquid electrolyte for a fluoride ion battery having high stability with respect to a fluoride ion. The present invention attains the object by providing a liquid electrolyte for a fluoride ion battery comprising: a fluoride salt; an alkali metal amide salt having an alkali metal cation and an amide anion; and a glyme represented by general formula: $R^1-O(CH_2CH_2O)_n-R^2$ (in which $R^1$ and $R^2$ each independently represent an alkyl group with 4 or less carbon atoms or a fluoroalkyl group with 4 or less carbon atoms, and n is in the range of 2 to 10).

6 Claims, 8 Drawing Sheets

(51) Int. Cl.
    *H01M 10/0568*    (2010.01)
    *H01M 10/0569*    (2010.01)

(56)         References Cited

U.S. PATENT DOCUMENTS

2012/0258357  A1    10/2012   Kim
2015/0044573  A1*    2/2015   Roschenthaler ....... C01D 15/00
                                                          429/306

FOREIGN PATENT DOCUMENTS

JP       2001-068154  A     3/2001
JP        2009529222  A     8/2009
KR       2012-0115839 A    10/2012
WO        2007146453  A2   12/2007

* cited by examiner

FIG. 1

FIG. 2A  TFSA ANION

FIG. 2B  FSA ANION

FIG. 2C  TMSA ANION

FIG. 2F  TMA-F

LIQUID ELECTROLYTE FOR FLUORIDE ION BATTERY AND FLUORIDE ION BATTERY

TECHNICAL FIELD

The present invention relates to a liquid electrolyte for a fluoride ion battery having high stability with respect to a fluoride ion.

BACKGROUND ART

As a battery with high voltage and high energy density, a Li ion battery is known, for example. The Li ion battery is a cation-based battery utilizing the reaction between a Li ion and a cathode active material and also the reaction between a Li ion and an anode active material. Meanwhile, as an anion-based battery, a fluoride ion battery utilizing a fluoride ion reaction is known.

For example, Patent Literature 1 discloses an electrochemical cell (fluoride ion battery) capable of propagating a cathode, an anode, and an anionic charge carrier ($F^-$). In addition, in Examples of Patent Literature 1, a liquid electrolyte obtained by dissolving $LiBF_4$ in an organic solvent with propylene carbonate (PC) and dimethyl carbonate (DMC) mixed therein is used.

CITATION LIST

Patent Literature

Patent Literature 1: Japanese Translation of PCT International Application (JP-A) No. 2009-529222

SUMMARY OF INVENTION

Technical Problem

Due to high reactivity of the fluoride ion, the fluoride ion reacts with other materials (solvent, in particular) before reaction with an active material, and thus there is a problem in that the fluoride ion cannot have a sufficient reaction with an active material.

The present invention is achieved under the aforementioned circumstances, and a main object of the present invention is to provide a liquid electrolyte for a fluoride ion battery having high stability with respect to a fluoride ion.

Solution to Problem

In order to achieve the above object, the present invention provides a liquid electrolyte for a fluoride ion battery comprising: a fluoride salt; an alkali metal amide salt having an alkali metal cation and an amide anion; and a glyme represented by general formula: $R^1$—$O(CH_2CH_2O)_n$—$R^2$ (in which $R^1$ and $R^2$ each independently represent an alkyl group with 4 or less carbon atoms or a fluoroalkyl group with 4 or less carbon atoms, and n is in the range of 2 to 10).

According to the present invention, when a fluoride salt, an alkali metal amide salt, and a glyme are combined, a liquid electrolyte for a fluoride ion battery having high stability with respect to a fluoride ion can be obtained.

In the aforementioned invention, it is preferable that "n" in the general formula be 3 or 4.

In the aforementioned invention, it is preferable that the glyme be a triglyme in which the $R^1$ and the $R^2$ are each a methyl group and "n" is 3.

In the aforementioned invention, it is preferable that the amide anion be bisfluorosulfonylamide (FSA) anion.

In the aforementioned invention, it is preferable that the alkali metal be Li.

In the aforementioned invention, it is preferable that the fluoride salt be tetramethylammonium fluoride.

Further, in the present invention, there is provided a fluoride ion battery comprising a cathode active material layer, an anode active material layer, and an electrolyte layer formed between the cathode active material layer and the anode active material layer, in which the electrolyte layer contains the above-described liquid electrolyte for a fluoride ion battery.

According to the present invention, when the above-described liquid electrolyte for a fluoride ion battery is used, it is possible to obtain a fluoride ion battery having high durability.

Advantageous Effects of Invention

The liquid electrolyte for a fluoride ion battery of the present invention exhibits an effect of high stability with respect to a fluoride ion.

DESCRIPTION OF EMBODIMENTS

Hereinafter, a liquid electrolyte for a fluoride ion battery and a fluoride ion battery of the present invention will be described in detail.

A. Liquid Electrolyte for Fluoride Ion Battery

The liquid electrolyte for a fluoride ion battery of the present invention comprises a fluoride salt, an alkali metal amide salt having an alkali metal cation and an amide anion, and a glyme represented by general formula: $R^1$—$O(CH_2CH_2O)_n$—$R^2$ (in which $R^1$ and $R^2$ each independently represent an alkyl group with 4 or less carbon atoms or a fluoroalkyl group with 4 or less carbon atoms, and n is in the range of 2 to 10).

According to the present invention, when a fluoride salt, an alkali metal amide salt, and a glyme are combined, a liquid electrolyte for a fluoride ion battery having high stability with respect to a fluoride ion can be obtained. Here, it can be expected that the glyme has high chemical stability with respect to a fluoride ion. On the other hand, the fluoride salt has an extremely strong ion binding property. Since an ether group included in the glyme does not have an enough electron-donating property to dissociate the ion bond of the fluoride salt, the fluoride salt is insoluble in the glyme. In this regard, when the alkali metal amide salt is used together with the fluoride salt and the glyme, the fluoride salt can be dissolved in the glyme. The reason for this is speculated that the dissociation of ions of the fluoride salt can be accelerated by the addition of the alkali metal amide salt. More specifically, the reason for this is speculated that, when the glyme is solvated with the alkali metal amide salt, the glyme is likely to be interacted with a fluoride ion and the dissociation of ions of the fluoride salt can be accelerated. Incidentally, in the liquid electrolyte for a fluoride ion battery of the present invention, it is preferable that the fluoride salt be completely dissolved, but at least a part of the fluoride salt may be dissolved.

In this way, the liquid electrolyte for a fluoride ion battery of the present invention has high stability with respect to a fluoride ion. For this reason, the fluoride ion can enhance the activity for fluorinating an active material and a battery reaction stably occurs in an electrode. Therefore, large capacity of the battery can be achieved. Further, since the stability with respect to the fluoride ion is high, an effect of improving Coulomb efficiency or an effect of suppressing generation of hydrofluoric acid (HF) can be obtained.

Hereinafter, each constitution of the liquid electrolyte for a fluoride ion battery of the present invention will be described.

1. Glyme

The glyme in the present invention is a compound represented by general formula: $R^1$—O(CH$_2$CH$_2$O)$_n$—$R^2$ (in which $R^1$ and $R^2$ each independently represent an alkyl group with 4 or less carbon atoms or a fluoroalkyl group with 4 or less carbon atoms, and "n" is in the range of 2 to 10).

In the above-described general formula, $R^1$ and $R^2$ may be same or different from each other. Further, the number of carbon atoms in $R^1$ or $R^2$ is generally 4 or less, and may be any of 4, 3, 2, and 1. When the number of carbon atoms in $R^1$ or $R^2$ is too large, the interaction with the fluoride ion may be sterically inhibited. Specific examples of the alkyl group with 4 or less carbon atoms include a methyl group, an ethyl group, a propyl group, an isopropyl group, a butyl group, a sec-butyl group, an isobutyl group, and a tert-butyl group. In addition, a fluoroalkyl group is a group in which apart or whole of hydrogen of the alkyl group is substituted with fluorine.

In the above-described general formula, "n" is generally in the range of 2 to 10. "n" may be 3 or more. When "n" is too small, an alkali metal ion may become a fluoride salt in the presence of a fluoride ion. On the other hand, "n" may be 8 or less, or may be 5 or less. When "n" is too large, the interaction between glymes becomes strong and thus solvation with the alkali metal ion may be less likely to occur. In the present invention, one kind of the glyme represented by the above-described general formula may be used alone or two or more thereof may be used in combination.

Further, examples of the glyme in the present invention may include diethylene glycol diethyl ether (G2), triethylene glycol dimethyl ether (G3), tetraethylene glycol dimethyl ether (G4), diethylene glycol dibutyl ether, diethylene glycol methylethyl ether, triethylene glycol methylethyl ether, and triethylene glycol butylmethyl ether.

2. Fluoride Salt

In the present invention, the fluoride salt is not particularly limited as long as it generates a fluoride ion which reacts with an active material. The fluoride salt may be an organic fluoride salt or an inorganic fluoride salt. Furthermore, the fluoride salt may be an ionic liquid.

The cation of the fluoride salt is not particularly limited, and examples thereof include a complex cation. Examples of the complex cation include an alkylammonium cation, an alkylphosphonium cation, and an alkylsulfonium cation. Examples of the alkylammonium cation include a cation represented by the following general formula.

[Chemical Formula 1]

In the above general formula, $R^1$ to $R^4$ each independently represent an alkyl group or a fluoroalkyl group. The number of carbon atoms of $R^1$ to $R^4$ is, for example, 10 or less, and may be 5 or less, or 3 or less.

As other examples of the cation of the fluoride salt, an alkali metal cation can be exemplified. Examples of the alkali metal may include Li, Na, K, Rb, and Cs.

The anion of the fluoride salt is not particularly limited as long as it generates a fluoride ion which reacts with an active material, and particularly, $F^-$ is preferable.

3. Alkali Metal Amide Salt

The alkali metal amide salt in the present invention has an alkali metal cation and an amide anion. The amide anion indicates an anion in which a proton is eliminated from a secondary amine ($R^1R^2NH$).

Examples of the alkali metal may include Li, Na, K, Rb, and Cs. Meanwhile, examples of the amide anion may include sulfonylamide anion and silylamide anion. The sulfonylamide anion is an anion in which N (anion center) in the amide anion and S of the sulfonyl group are bound with each other. The sulfonylamide anion may have one or two sulfonyl groups. It is preferable that the sulfonyl group be bound with an alkyl group (for example, 4 or less carbon atoms), a fluoroalkyl group (for example, 4 or less carbon atoms), or fluorine. Examples of the sulfonylamide anion may include bisfluorosulfonylamide (FSA) anion and bis-trifluoromethane sulfonylamide (TFSA) anion.

The silylamide anion is an anion in which N (anion center) in the amide anion and Si of the silyl group are bound with each other. The silylamide anion may have one or two silyl group. It is preferable that the silyl group be bound with an alkyl group (for example, 4 or less carbon atoms), a fluoroalkyl group (for example, 4 or less carbon atoms), or fluorine. Examples of the silylamide anion may include bistrimethyl silylamide (TMSA) anion, bistrifluoromethyl silylamide anion, bistrifluorosilylamide anion, bistriethyl silylamide anion, bistertbutyl dimethyl silylamide anion, and trimethyl silyl trifluoromethyl silylamide anion. In addition, the amide anion is preferably a symmetrical amide anion in which two functional groups bound to N (anion center) are the same.

4. Liquid Electrolyte for Fluoride Ion Battery

The liquid electrolyte for a fluoride ion battery of the present invention generally contains the above-described glyme as a solvent. The solvent of the liquid electrolyte for a fluoride ion battery may be only the glyme represented by the above-described general formula or may be a mixture of the glyme represented by the above-described general formula and other solvent. The ratio of the glyme relative to the whole solvent is, for example, 10 mol % or more, preferably 30 mol % or more, more preferably 50 mol % or more, even more preferably 70 mol % or more, and particularly preferably 90 mol % or more.

Examples of other solvent include an ionic liquid and a non-aqueous solvent. The ionic liquid indicates a material which has a melting point of 100° C. or lower. In particular, the melting point of an ionic liquid is preferably 50° C. or lower, and more preferably, 25° C. or lower.

Examples of the cation of an ionic liquid include a piperidinium skeleton cation, a pyrrolidinium skeleton cation, an imidazolium skeleton cation, an ammonium cation, and a phosphonium cation.

Examples of the anion of an ionic liquid include an amide anion represented by bisfluorosulfonylamide (FSA) anion and bistrifluoromethane sulfonylamide (TFSA) anion, a phosphate anion represented by hexafluorophosphate anion and tris(pentafluoroethyl)trifluorophosphate anion, a tetrafluoroborate (TFB) anion, and a triflate anion.

The type of the non-aqueous solvent is not particularly limited, and examples thereof include ethylene carbonate (EC), fluoroethylene carbonate (FEC), difluoroethylene carbonate (DFEC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran, dimethyl sulfoxide (DMSO), and a mixture of any of them.

The concentration of the fluoride salt in the liquid electrolyte for a fluoride ion battery is not particularly limited, and for example, 0.1 mol/L or more, preferably 0.3 mol/L or more, and more preferably 0.5 mol/L or more. On the other hand, the concentration of the fluoride salt is, for example, 6 mol/L or less, and preferably 3 mol/L or less.

The concentration of the alkali metal amide salt in the liquid electrolyte for a fluoride ion battery is not particularly limited, and for example, 0.5 mol/L or more, preferably 2.5 mol/L or more, and more preferably 4 mol/L or more. On the other hand, the concentration of the alkali metal amide salt is, for example, 8 mol/L or less, and preferably 6 mol/L or less.

The molar ratio (B/A) of the fluoride salt (B) relative to the alkali metal amide salt (A) is, for example, in the range of 0.02 to 1.5, and preferably in the range of 0.05 to 1.

Incidentally, it is difficult for $F^-$ to dissociate from HF in $F(HF)_x^-$ anion. For this reason, sufficient fluorination of an active material is not easily obtained in some cases. Incidentally, "x" is a real number larger than 0, and satisfies the relationship of $0 < x \le 5$, for example. For this reason, it is preferable that the liquid electrolyte for a fluoride ion battery contain substantially no $F(HF)_x^-$ anion. The expression "contain substantially no $F(HF)_x^-$ anion" means that the ratio of $F(HF)_x^-$ anion relative to the whole anions present in the liquid electrolyte is 0.5 mol % or less. The ratio of $F(HF)_x^-$ anion is preferably 0.3 mol % or less.

B. Fluoride Ion Battery

Figure 1:
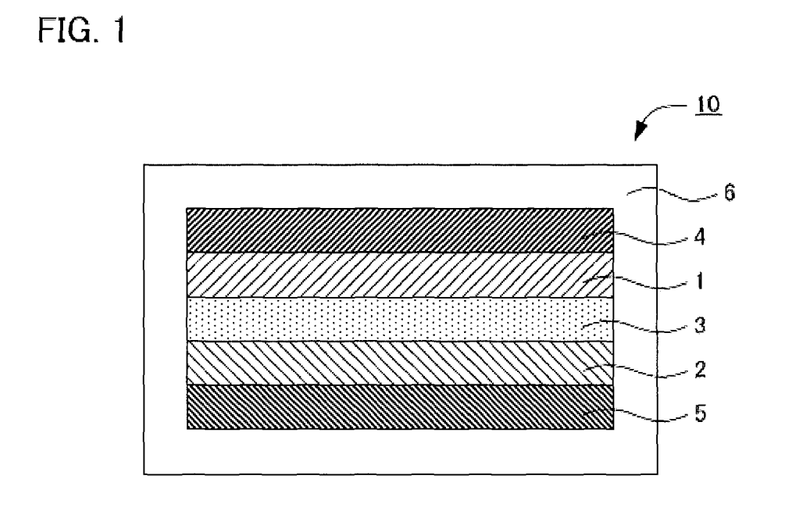
FIG. 1 is a schematic cross-sectional view illustrating an exemplary fluoride ion battery of the present invention.
Figure 2A:
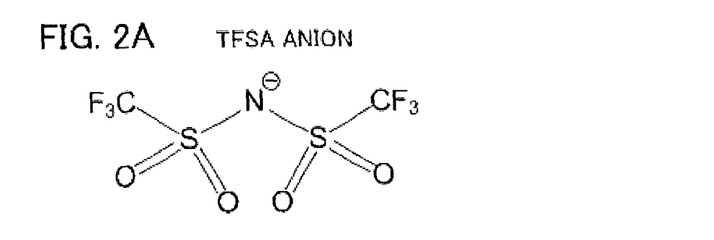
FIGS. 2A to 2F show chemical formulas describing compounds used in Examples 1 to 8 and Comparative Examples 1 and 2.
Figure 2B:
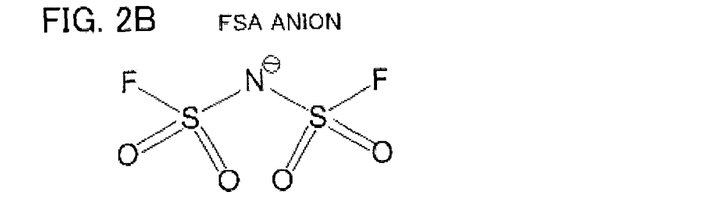
Figure 2C:
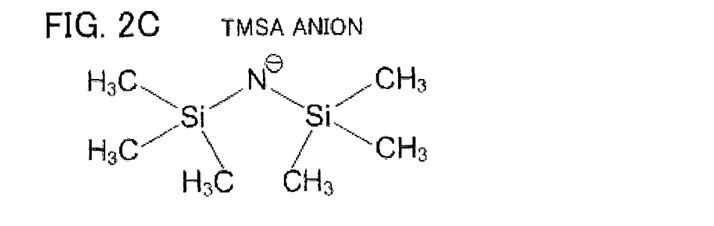
Figure 2D:
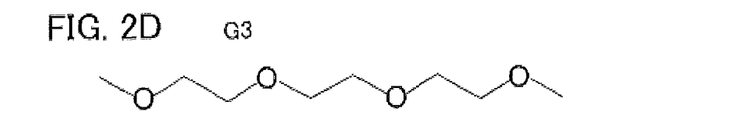
Figure 2E:
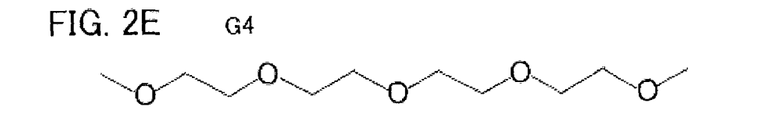
Figure 2F:
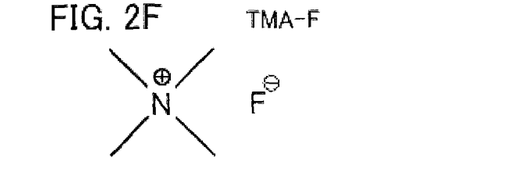

FIG. 1 is a schematic cross-sectional view illustrating an exemplary fluoride ion battery of the present invention. A fluoride ion battery 10 illustrated in FIG. 1 comprises a cathode active material layer 1, an anode active material layer 2, an electrolyte layer 3 formed between the cathode active material layer 1 and the anode active material layer 2, a cathode current collector 4 for collecting current by the cathode active material layer 1, an anode current collector 5 for collecting current by the anode active material layer 2, and a battery case 6 for containing those members. Furthermore, the electrolyte layer 3 contains "A. Liquid Electrolyte for Fluoride Ion Battery" which is described above.

According to the present invention, when the aforementioned liquid electrolyte for a fluoride ion battery is used, a fluoride ion battery having high durability can be provided.

Hereinafter, each constitution of the fluoride ion battery of the present invention will be described.

1. Electrolyte Layer

The electrolyte layer in the present invention is a layer which is formed between the cathode active material layer and the anode active material layer. In the present invention, the electrolyte layer contains the aforementioned liquid electrolyte for a fluoride ion battery. The thickness of the electrolyte layer varies greatly depending on the constitution of a battery, and is not particularly limited.

2. Cathode Active Material Layer

The cathode active material layer in the present invention is a layer which contains at least a cathode active material. Furthermore, the cathode active material layer may further contain at least one of a conductive material and a binder, in addition to a cathode active material.

The cathode active material in the present invention is an active material which generally de-fluorinates at discharge. Examples of the cathode active material include a metal element, an alloy, a metal oxide, and a fluoride thereof. Examples of the metal element included in the cathode active material include Cu, Ag, Ni, Co, Pb, Ce, Mn, Au, Pt, Rh, V, Os, Ru, Fe, Cr, Bi, Nb, Sb, Ti, Sn, and Zn. Among them, the cathode active material is preferably Cu, $CuF_x$, Fe, $FeF_x$, Ag, or $AgF_x$. Incidentally, "x" is a real number larger than 0. Other examples of the cathode active material include a carbon material and a fluoride thereof. Examples of the carbon material include graphites, cokes, and carbon nanotubes. Furthermore, other examples of the cathode active material include a polymer material. Examples of the polymer material include polyaniline, polypyrrole, polyacetylene, and polythiophene.

The conductive material is not particularly limited as long as it has desired electron conductivity. Examples thereof include a carbon material. Examples of the carbon material include carbon black such as acetylene black, ketjen black, furnace black, or thermal black. Meanwhile, the binder is not particularly limited as long as it is chemically and electrically stable. Examples thereof include a fluorine-based binder such as polyvinylidene fluoride (PVDF) and polytetrafluoroethylene (PTFE). Furthermore, higher content of the cathode active material in the cathode active material layer is preferred from the viewpoint of capacity. Furthermore, the thickness of the cathode active material layer varies greatly depending on the constitution of a battery, and is not particularly limited.

3. Anode Active Material Layer

The anode active material layer in the present invention is a layer which contains at least an anode active material. Furthermore, the anode active material layer may further contain at least one of a conductive material and a binder, in addition to an anode active material.

The anode active material in the present invention is an active material which generally fluorinates at discharge. As for the anode active material, any active material having lower potential than that of the cathode active material can be selected. For these reasons, the aforementioned cathode active material may be also used as an anode active material. Examples of the anode active material include a metal element, an alloy, a metal oxide, and a fluoride thereof. Examples of the metal element included in the anode active material include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Among them, the anode active material is preferably Mg, $MgF_x$, Al, $AlF_x$, Ce, $CeF_x$, Ca, $CaF_x$, Pb, or $PbF_x$. Incidentally, "x" is a real number larger than 0. Furthermore, as the anode active material, the aforementioned carbon material and polymer material can be also used.

The same conductive material and binder as those described above for the cathode active material layer can be also used. Furthermore, higher content of the anode active material in the anode active material layer is preferred from the viewpoint of capacity. Furthermore, the thickness of the anode active material layer varies greatly depending on the constitution of a battery, and is not particularly limited.

4. Other Constitutions

The fluoride ion battery of the present invention comprises at least the anode active material layer, the cathode active material layer, and the electrolyte layer that are described above. Furthermore, the fluoride ion battery generally comprises a cathode current collector for collecting current by the cathode active material layer and an anode current collector for collecting current by the anode active material layer. Examples of the shape of the current collector include a thin film shape, a mesh shape, and a porous shape. Furthermore, the fluoride ion battery of the present invention may comprise a separator between the cathode active material layer and the anode active material layer, since a battery having even higher safety can be obtained.

5. Fluoride Ion Battery

The fluoride ion battery of the present invention is not particularly limited as long as it comprises the cathode active material layer, the anode active material layer, and the electrolyte layer that are described above. In addition, the fluoride ion battery of the present invention may be a primary battery or a secondary battery. In particular, a secondary battery is preferable, since the secondary battery can be repeatedly charged and discharged and is useful as, for example, a battery mounted on an automobile. Examples of the shape of the fluoride ion battery of the present invention include a coin shape, a laminate shape, a cylindrical shape, and a square shape.

Incidentally, the present invention is not limited to the embodiments described above. The above embodiments are merely an exemplification and any of those having substantially the same constitution as the technical idea described in Claims of the present invention and exhibiting the same working effects as those are included in the technical scope of the present invention.

EXAMPLES

Hereinafter, the present invention will be described in more detail by means of Examples.

Example 1

Lithium bistrifluoromethane sulfonylamide (Li-TFSA, manufactured by Kishida Chemical Co., Ltd.) and cesium fluoride (CsF, manufactured by KANTO CHEMICAL CO., INC.) were mixed in a tetraglyme (G4, tetraethylene glycol dimethyl ether, manufactured by Kishida Chemical Co., Ltd.) such that molar concentrations of Li-TFSA and CsF became 4.5 mol/L and 4.6 mol/L. After that, the resultant mixture was stirred under conditions including 60° C. for 70 hours or longer within a sealed container made of a fluororesin, thereby obtaining a liquid electrolyte for evaluation.

Example 2

Lithium bistrifluoromethane sulfonylamide (Li-TFSA, manufactured by Kishida Chemical Co., Ltd.) and cesium fluoride (CsF, manufactured by KANTO CHEMICAL CO., INC.) were mixed in a triglyme (G3, triethylene glycol dimethyl ether, manufactured by Kishida Chemical Co., Ltd.) such that molar concentrations of Li-TFSA and CsF became 5.5 mol/L and 5.5 mol/L. After that, the resultant mixture was stirred under conditions including 60° C. for 70 hours or longer within a sealed container made of a fluororesin, thereby obtaining a liquid electrolyte for evaluation.

Example 3

A liquid electrolyte for evaluation was obtained in the same manner as in Example 2, except that the molar concentration of CsF was changed to 0.55 mol/L.

Example 4

A liquid electrolyte for evaluation was obtained in the same manner as in Example 3, except that lithium bisfluorosulfonylamide (Li-FSA, manufactured by Kishida Chemical Co., Ltd.) was used instead of Li-TFSA.

Example 5

A liquid electrolyte for evaluation was obtained in the same manner as in Example 2, except that lithium fluoride (LiF, manufactured by Wako Pure Chemical Industries, Ltd.) was used instead of CsF.

Example 6

A liquid electrolyte for evaluation was obtained in the same manner as in Example 5, except that cesium bistrifluoromethane sulfonylamide (Cs-TFSA, manufactured by SOLVIONIC) was used instead of Li-TFSA.

Example 7

A liquid electrolyte for evaluation was obtained in the same manner as in Example 3, except that tetramethylammonium fluoride (TMA-F, manufactured by Alfa Aesar, A Johnson Matthey Company) was used instead of CsF.

Example 8

A liquid electrolyte for evaluation was obtained in the same manner as in Example 3, except that lithium bistrimethyl silylamide (Li-IMSA) was used instead of Li-TFSA.

Comparative Example 1

A liquid electrolyte for evaluation was obtained in the same manner as in Example 1, except that CsF was not used.

Comparative Example 2

A liquid electrolyte for evaluation was obtained in the same manner as in Example 2, except that CsF was not used. Incidentally, in Table 1, compositions of the liquid electrolytes for evaluation obtained in Examples 1 to 8 and Comparative Examples 1 and 2 are shown. In addition, FIGS. 2A to 2F show chemical formulas describing compounds used in Examples 1 to 8 and Comparative Examples 1 and 2.

TABLE 1

| | Glyme | Alkali metal amide salt | Fluoride salt |
|---|---|---|---|
| EXAMPLE 1 | G4 | Li-TFSA (4.5 mol/L) | CsF (4.6 mol/L) |
| EXAMPLE 2 | G3 | Li-TFSA (5.5 mol/L) | CsF (5.5 mol/L) |
| EXAMPLE 3 | G3 | Li-TFSA (5.5 mol/L) | CsF (0.55 mol/L) |
| EXAMPLE 4 | G3 | Li-FSA (5.5 mol/L) | CsF (0.55 mol/L) |
| EXAMPLE 5 | G3 | Li-TFSA (5.5 mol/L) | LiF (5.5 mol/L) |
| EXAMPLE 6 | G3 | Cs-TFSA (5.5 mol/L) | LiF (5.5 mol/L) |
| EXAMPLE 7 | G3 | Li-TFSA (5.5 mol/L) | TMA-F (0.55 mol/L) |
| EXAMPLE 8 | G3 | Li-TMSA (5.5 mol/L) | CsF (0.55 mol/L) |
| COMPRATIVE EXAMPLE 1 | G4 | Li-TFSA (4.5 mol/L) | — |
| COMPRATIVE EXAMPLE 2 | G3 | Li-TFSA (5.5 mol/L) | — |

Comparative Examples 3 to 6

A liquid electrolyte for evaluation (G4+CsF) was prepared in the same manner as in Example 1, except that an alkali metal amide salt was not used in Comparative Example 3. A liquid electrolyte for evaluation (G3+CsF) was prepared in the same manner as in Example 3, except that an alkali metal amide salt was not used in Comparative Example 4. A liquid electrolyte for evaluation (G3+LiF) was prepared in the same manner as in Example 5, except that an alkali metal amide salt was not used in Comparative Example 5. A liquid electrolyte for evaluation (G3+TMA-F) was prepared in the same manner as in Example 7, except that an alkali metal amide salt was not used in Comparative Example 6. However, in all Comparative Examples 3 to 6, a fluoride salt was not dissolved.

[Evaluation]
(Measurement of Cyclic Voltammetry)

CV measurement was performed for the liquid electrolyte for evaluation obtained in each of Examples 1 to 8 and Comparative Examples 1 and 2. Specifically, the evaluation was made by using a dip type three-electrode cell in a glove box under Ar atmosphere. For an acting electrode, an Al plate or an Mg plate was used. For a counter electrode, a composite electrode composed of PTFE, acetylene black (AB), and fluorinated carbon was used. Incidentally, the composite electrode is an electrode with a weight ratio of PTFE:AB:fluorinated carbon=1:2:7. Further, by using vycor glass, a standard electrode was separated from the liquid electrolyte for evaluation. Incidentally, as for the standard electrode, Ag wire immersed in an acetonitrile solution, in which each of silver nitrate and tetrabutyl ammonium perchlorate is dissolved at a concentration of 0.1 M, was used. Furthermore, the measurement was performed under conditions including room temperature and a sweep rate of 1 mV/s.

Figure 3:
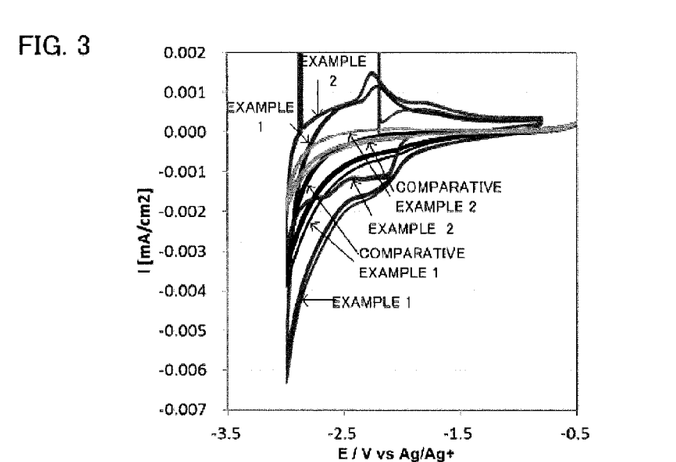
FIG. 3 shows the result of CV measurement (using an Al plate) of the liquid electrolyte for evaluation obtained in each of Examples 1 and 2 and Comparative Examples 1 and 2.
Figure 4A:
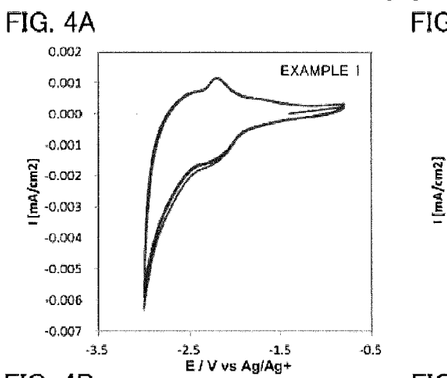
FIGS. 4A to 4D show the result of CV measurement (using an Al plate) of the liquid electrolyte for evaluation obtained in each of Examples 1 and 2 and Comparative Examples 1 and 2.
Figure 4B:
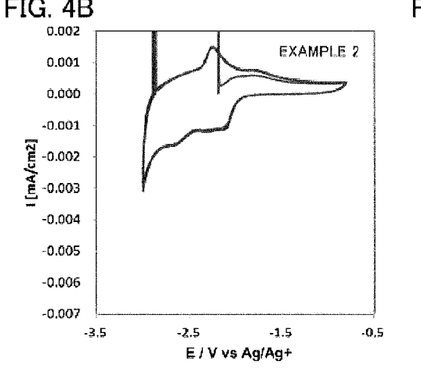
Figure 4C:
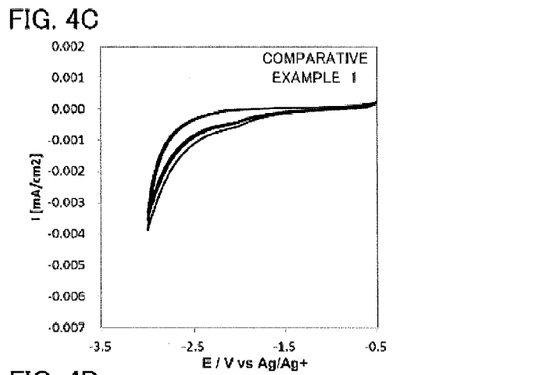
Figure 4D:
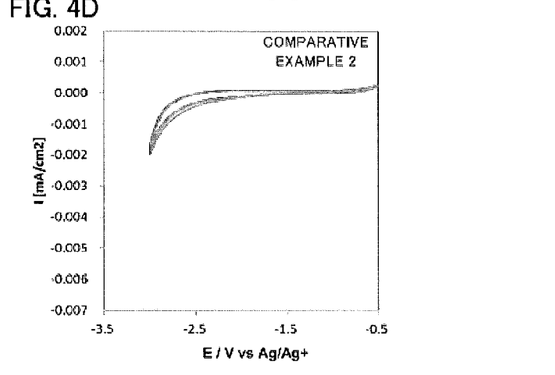
Figure 5:
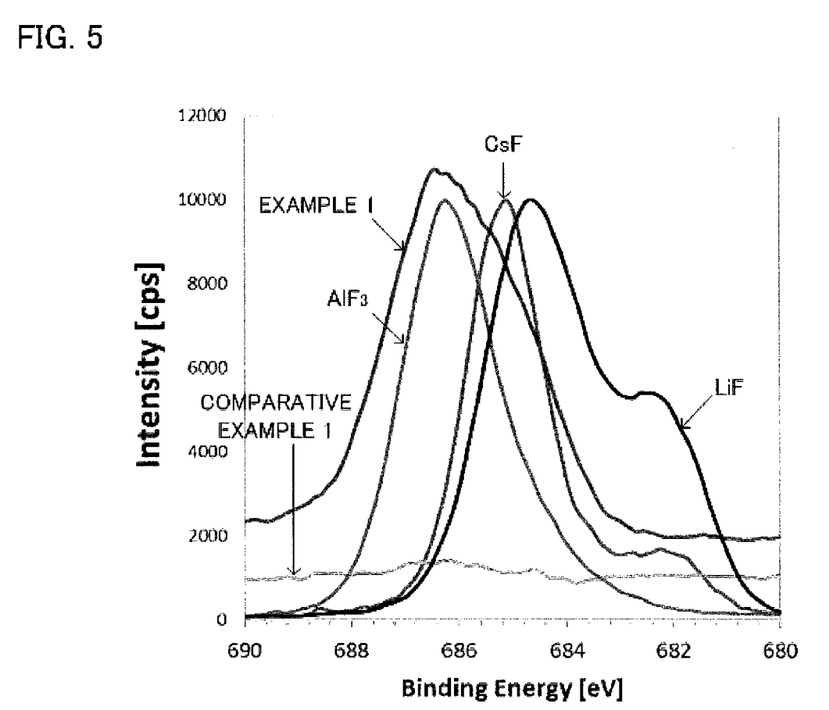
FIG. 5 shows the result of XPS measurement of the Al electrode after the CV measurement.

First, FIG. 3 shows the result of CV measurement (using an Al plate) of the liquid electrolyte for evaluation obtained in each of Examples 1 and 2 and Comparative Examples 1 and 2. FIGS. 4A to 4D show each result separately. As shown in FIGS. 3 and 4A to 4D, when Examples 1 and 2 are compared with Comparative Examples 1 and 2, in Examples 1 and 2, an oxidation current peak accompanied with fluorination of Al and a reduction current peak accompanied with de-fluorination of fluorinated Al were determined around −2.5 V. Further, XPS measurement was performed for the Al electrode after the CV measurement. The results thereof are shown in FIG. 5. As shown in FIG. 5, when Example 1 is compared with Comparative Example 1, a fluorine peak belonging to $AlF_3$ could be determined in Example 1.

Figure 6A:
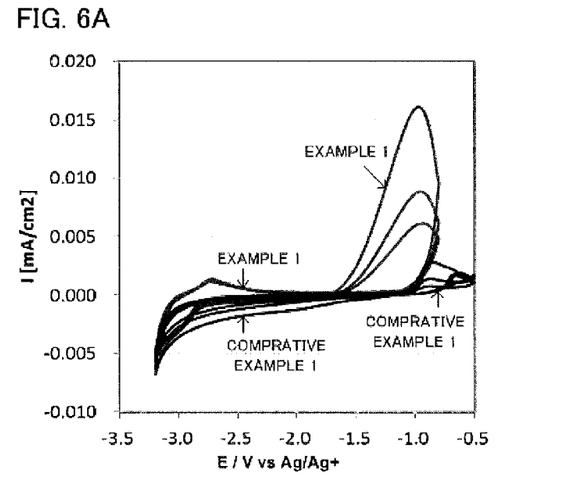
FIGS. 6A to 6C show the result of CV measurement (using an Mg plate) of the liquid electrolyte for evaluation obtained in each of Example 1 and Comparative Example 1.
Figure 6B:
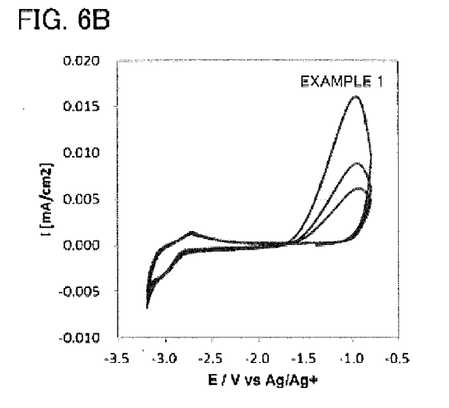
Figure 6C:
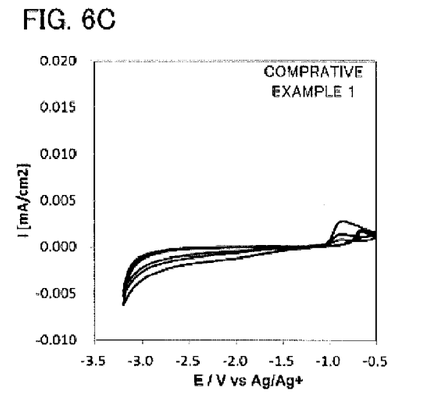
Figure 7A:
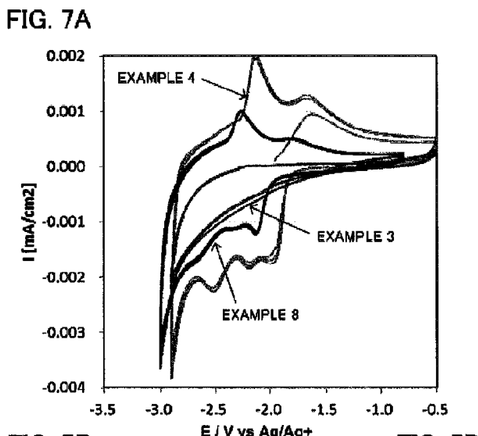
FIGS. 7A to 7D show the result of CV measurement (using an Al plate) of the liquid electrolyte for evaluation obtained in each of Examples 3, 4, and 8.
Figure 7B:
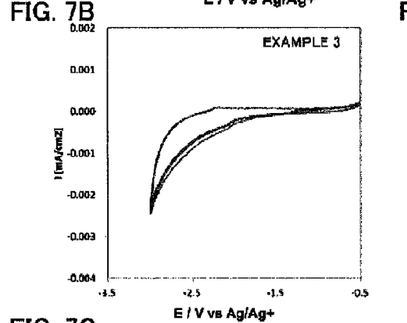
Figure 7C:
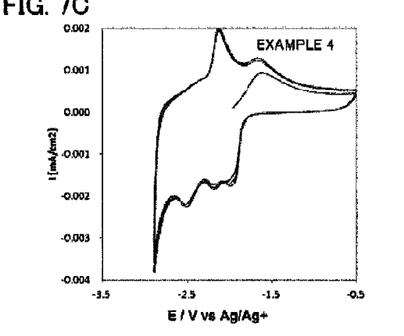
Figure 7D:
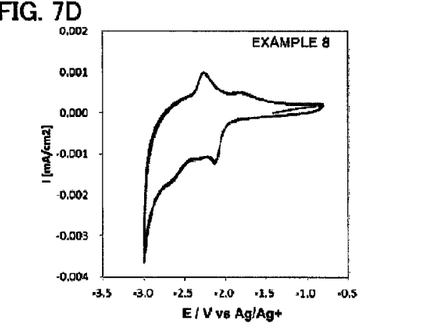

Further, FIGS. 6A to 6C show the result of CV measurement (using an Mg plate) of the liquid electrolyte for evaluation obtained in each of Example 1 and Comparative Example 1. As shown in FIGS. 6A to 6C, when Example 1 is compared with Comparative Example 1, in Example 1, an oxidation current peak accompanied with fluorination of Mg and a reduction current peak accompanied with de-fluorination of fluorinated Mg were determined around −3 V. In this way, it was suggested that the liquid electrolyte containing a glyme, an alkali metal amide salt, and a fluoride salt is useful as a liquid electrolyte for a fluoride ion battery. In particular, it was possible to confirm fluorination and de-fluorination with respect to useful active materials of Al (theoretical potential: −2.14 V, gravimetric and volumetric energy density: 957 Ah/kg) and Mg (theoretical potential: −2.76 V, gravimetric and volumetric energy density: 860 Ah/kg).

Further, when Examples 1 and 2 in FIGS. 3 and 4A to 4D are compared with each other, the electric quantity of the de-fluorination (the electric quantity of the reduction current) in Example 2 is smaller than that in Example 1, but the electric quantity of the fluorination (the electric quantity of the oxidation current) in Example 2 is larger than that in Example 1. Therefore, it was suggested that G3 contributed to the improvement of reversibility (Coulomb efficiency) of fluorination and de-fluorination as compared to G4.

Next, FIGS. 7A to 7D show the result of CV measurement (using an Al plate) of the liquid electrolyte for evaluation obtained in each of Examples 3, 4, and 8. As shown in FIGS. 7A to 7D, when Examples 3, 4, and 8 are compared with each other, the electric quantity of the fluorination (the electric quantity of the oxidation current) and the electric quantity of the de-fluorination (the electric quantity of the reduction current) in Examples 4 and 8 were larger than those in Example 3. That is, the reaction amount of Al was large. In addition, in Examples 4 and 8, since the electric quantity of the fluorination (the electric quantity of the oxidation current) is almost the same as the electric quantity of the de-fluorination (the electric quantity of the reduction current), reversibility is favorable. Therefore, it was suggested that the FSA anion and the TMSA anion contributed to the improvement of maximum current density (the used amount of the active material) as compared to the TFSA anion, and contributed to the improvement of reversibility (Coulomb efficiency) of fluorination and de-fluorination.

Further, when Examples 3 and 4 are compared with Example 8, a sulfonyl group in sulfonyl amide attracts an electric charge from N (anion center) of an amide group but a silyl group in silylamide supplies an electric charge to N (anion center) of an amide group. That is, the sulfonyl group and the silyl group have opposite properties to each other. It was suggested that, since fluorination and de-fluorination of Al occur in all of Examples 3, 4, and 8 although the sulfonyl group and the silyl group have opposite properties to each other, the phenomenon that the dissociation of ions of the fluoride salt can be accelerated by the addition of the alkali metal amide salt is largely affected by N (anion center) of an amide group. Therefore, it is speculated that the dissociation of ions of the fluoride salt can be accelerated similarly not only in the case of sulfonylamide anion and silyl anion but also in the case of an amide anion.

Figure 8A:
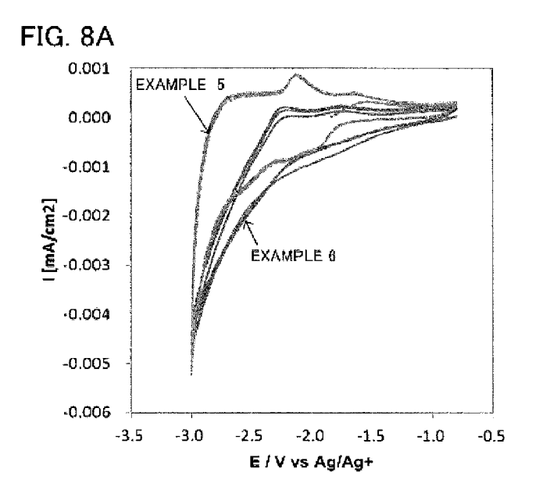
FIGS. 8A to 8C show the result of CV measurement (using an Al plate) of the liquid electrolyte for evaluation obtained in each of Examples 5 and 6.
Figure 8B:
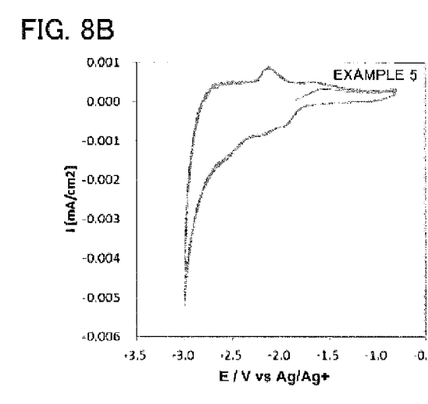
Figure 8C:
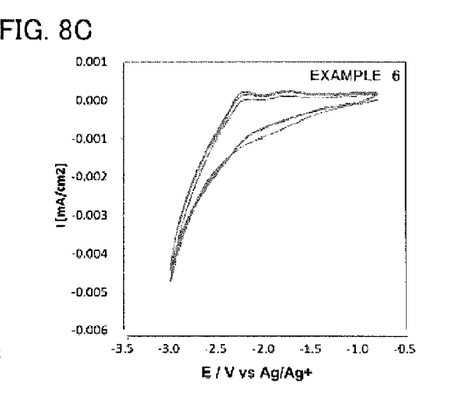

Next, FIGS. 8A to 8C show the result of CV measurement (using an Al plate) of the liquid electrolyte for evaluation obtained in each of Examples 5 and 6. As shown in FIGS. 8A to 8C, when Examples 5 and 6 are compared with each other, an oxidation current peak (around −2.2 V) accompanied with fluorination of Al and a reduction current peak (around −2.6 V) accompanied with de-fluorination of fluorinated Al in Example 5 could be determined more clearly as compared to Example 6. In addition, in Example 5, since the electric quantity of the fluorination (the electric quantity of the oxidation current) is larger than the electric quantity of the de-fluorination (the electric quantity of the reduction current), reversibility is favorable. Therefore, it was suggested that, when Li was used as the cation of the alkali metal amide salt, Li contributed to the improvement of reversibility (Coulomb efficiency) of fluorination and de-fluorination as compared to the case of using Cs.

Figure 9A:
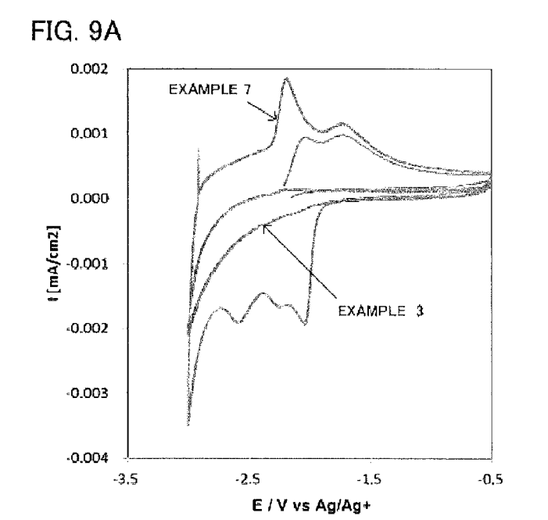
FIGS. 9A to 9C show the result of CV measurement (using an Al plate) of the liquid electrolyte for evaluation obtained in each of Examples 3 and 7.
Figure 9B:
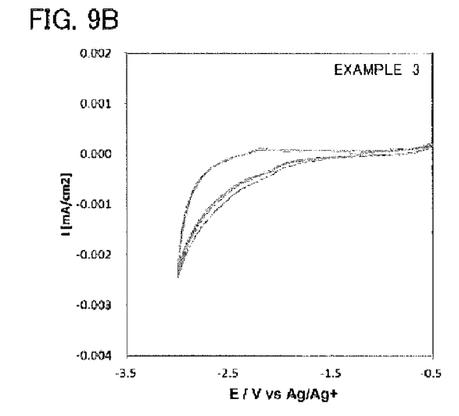
Figure 9C:
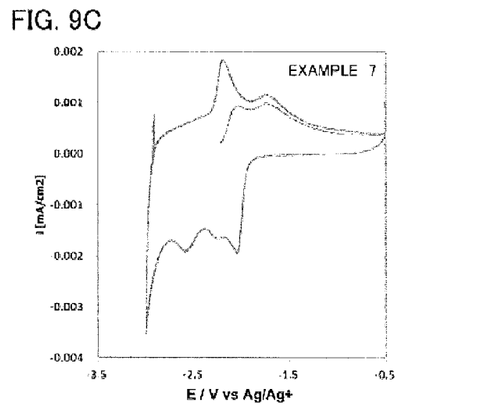

Next, FIGS. 9A to 9C show the result of CV measurement (using an Al plate) of the liquid electrolyte for evaluation obtained in each of Examples 3 and 7. As shown in FIGS. 9A to 9C, when Examples 3 and 7 are compared with each other, the electric quantity of the fluorination (the electric quantity of the oxidation current) and the electric quantity of the de-fluorination (the electric quantity of the reduction current) in Example 7 were larger than those in Example 3. That is, the reaction amount of Al was large. In addition, in Example 7, since the electric quantity of the fluorination (the electric quantity of the oxidation current) is almost the same as the electric quantity of the de-fluorination (the electric quantity of the reduction current), reversibility is favorable. Therefore, it was suggested that, when an organic cation was used as a cation of the fluoride salt, the organic cation contributed to the improvement of maximum current density (the used amount of the active material) as compared to the case of using an inorganic cation, and contributed to the improvement of reversibility (Coulomb efficiency) of fluorination and de-fluorination.

REFERENCE SIGNS LIST

1 cathode active material layer
2 anode active material layer
3 electrolyte layer
4 cathode current collector
5 anode current collector
6 battery case
10 fluoride ion battery

What is claimed is:
1. A fluoride ion battery comprising:
a cathode active material layer,
an anode active material layer, and
an electrolyte layer formed between the cathode active material layer and the anode active material layer, wherein
the electrolyte layer contains a liquid electrolyte comprising:
a fluoride salt,
an alkali metal amide salt having an alkali metal cation and an amide anion, and
a glyme represented by general formula: $R^1$—O$(CH_2CH_2O)_n$—$R^2$ wherein
$R^1$ and $R^2$ each independently represent an alkyl group with 4 or less carbon atoms or a fluoroalkyl group with 4 or less carbon atoms, and
n is in the range of 2 to 10.
2. The fluoride ion battery according to claim 1, wherein "n" in the general formula is 3 or 4.
3. The fluoride ion battery according to claim 1, wherein the glyme is a triglyme in which the $R^1$ and the $R^2$ are each a methyl group and "n" is 3.
4. The fluoride ion battery according to claim 1, wherein the amide anion is bisfluorosulfonylamide (FSA) anion.
5. The fluoride ion battery according to claim 1, wherein the alkali metal is Li.
6. The fluoride ion battery according to claim 1, wherein the fluoride salt is tetramethylammonium fluoride.

* * * * *